United States Patent [19]

Kessler et al.

[11] Patent Number: 5,475,416
[45] Date of Patent: Dec. 12, 1995

[54] PRINTING SYSTEM FOR PRINTING AN IMAGE WITH LASERS EMITTING DIVERGING LASER BEAMS

[75] Inventors: David Kessler, Rochester; Sanwal P. Sarraf, Webster, both of N.Y.

[73] Assignee: Eastman Kodak Company, Rochester, N.Y.

[21] Appl. No.: 892,915

[22] Filed: Jun. 3, 1992

[51] Int. Cl.[6] .................................................. B41J 2/455
[52] U.S. Cl. ........................ 347/244; 347/243; 347/241
[58] Field of Search ............................ 346/107 R, 108; 359/363; 347/134, 241, 243, 244, 256, 258, 259

[56] References Cited

U.S. PATENT DOCUMENTS

| | | | |
|---|---|---|---|
| 2,510,200 | 6/1950 | Thompson | 346/108 |
| 4,053,898 | 10/1977 | Hirayama et al. | 346/1 |
| 4,253,102 | 2/1981 | Kataoka et al. | 346/108 |
| 4,530,574 | 7/1985 | Scifres et al. | 359/668 |
| 4,673,953 | 6/1987 | Hecht | 346/108 |
| 4,681,394 | 7/1987 | Noguchi | 350/6.6 |
| 4,743,091 | 5/1988 | Gelbart | 350/252 |
| 4,763,134 | 8/1988 | Murahashi et al. | 346/108 X |
| 4,821,113 | 4/1989 | McQuade et al. | 346/108 X |
| 4,878,066 | 10/1989 | Shiraishi | 346/108 |
| 4,892,371 | 1/1990 | Yamada et al. | 350/6.8 |
| 4,907,017 | 3/1990 | Azuma | 346/108 |
| 4,918,465 | 4/1990 | Morita | 346/108 |
| 4,924,321 | 5/1990 | Miyagawa et al. | 358/296 |
| 4,978,197 | 12/1990 | Horikawa | 350/174 |
| 4,978,974 | 12/1990 | Etzel | 346/107 R |
| 4,989,019 | 1/1991 | Loce et al. | 346/108 |
| 5,014,075 | 5/1991 | Okino | 346/108 |
| 5,251,055 | 10/1993 | Koide | 346/108 X |

FOREIGN PATENT DOCUMENTS 0323845  7/1989  European Pat. Off. .......... G02B 5/04

*Primary Examiner*—Benjamin R. Fuller
*Assistant Examiner*—David Yockey
*Attorney, Agent, or Firm*—Dennis R. Arndt

[57] ABSTRACT

A laser printing system includes plurality of N channel where each channels includes a laser diode forming a laser light beam which is shaped by a beam shaper to correct for divergence differences between the lasers of the N channels. The plurality of N output laser light beams from the plurality of N beam shapers are circular in cross-section, and are combined at a stop aperture in a stop plane with a predetermined angular separation. Various techniques are disclosed for combining the plurality of N output laser light beams. An optical system relays the combined plurality of N angularly separated output laser light beams at the stop plane to a light sensitive print medium to form a spot for each laser light beam. The spots are then scanned across the print medium to print a desired image. The optical system transforms the predetermined angular separations of the plurality of N laser light beams at the stop aperture into second predetermined angular separations at a rear stop image plane of the optical system. The second predetermined angular separations are less than the first predetermined angular separations by a magnification factor of the optical system.

20 Claims, 5 Drawing Sheets

PRINTING SYSTEM FOR PRINTING AN IMAGE WITH LASERS EMITTING DIVERGING LASER BEAMS

FIELD OF THE INVENTION

The present invention relates to printing techniques using multiple diode lasers emitting light beams which are combined to form a linear or two-dimensional array.

BACKGROUND OF THE INVENTION

In order to print high resolution images on a light sensitive medium, various techniques have been developed to scan a laser beam over the light sensitive medium. A first technique is to deflect one or more laser beams over the light sensitive medium by means such as polygons or hologons. In this regard see, for example, U.S. Pat. No. 4,989,019 (R. P. Loce et al.), issued on Jan. 29, 1991, and U.S. Pat. No. 5,014,075 (Y. Okino), issued on May 7, 1991.

In certain cases, it is necessary to move the light beam across the light sensitive medium slowly because of low light sensitivity of the medium such as a dye transfer medium. In order to print at reasonable speeds in terms of prints per hour, multi-spot printers have been developed wherein, for example, a plurality of individually modulated light spots are separately moved across the medium.

U.S. Pat. No. 4,743,091 (D. Gelbart), issued on May 10, 1989, discloses a two-dimensional diode array for use in optical data storage. The array comprises rows and columns of laser diodes, each diode including a separate collimating lens. The diodes and the collimating lenses of the array are located on a spherical reference sphere and combined for imaging on an optical recording medium via a series of lenses. The optical recording medium is moving relative to the array image to provide scanning. Additionally, the rows of diodes of the array are offset relative to a previous row in a direction of the rows by an amount less than the spacing of the columns. An unrecognized problem with this two-dimensional diode array is that the size of spots produced at the optical recording medium vary due the different divergence angles of the beams from the various laser diodes of the array.

U.S. Pat. No. 4,681,394 (M. Noguchi), issued on Jul. 21, 1987, discloses a light beam scanning system representing another technique for scanning a plurality of laser beams over the light sensitive medium. More particularly, a plurality of laser beams emitted by a plurality of semiconductor lasers are combined into a single beam. The single laser beam formed from the combined laser beams is deflected to scan the surface to be scanned on the light sensitive medium. This technique, however, may not be suitable for some media such as a thermal dye media where certain power density limits have to be observed to prevent media decomposition. To meet such power density limits with a high density laser, the laser spot size has to be increased. This, however, causes a reduction in resolution of the image. A similar arrangement is disclosed in U.S. Pat. No. 4,924,321 (I. Miyagawa et al.), issued on May 8, 1990.

U.S. Pat. No. 4,907,017 (J. Azuma), issued on Mar. 6, 1990, discloses a laser optical apparatus representing a technique which uses first and second laser diodes where the laser beams therefrom are not combined. Instead, each of the first and second laser diodes transmits its laser beam through separate input optics and a separate set of scanning optics which share a deflector in the form of a polygonal mirror. The direction of the first and second laser beams are substantially parallel to each other.

U.S. Pat. No. 4,053,898 (K. Hirayama et al.), issued on Oct. 11, 1977, discloses a laser recording technique where one powerful laser transmits a light beam which is divided into a plurality of laser beams. More particularly, the plurality of laser beams are deflected and further divided into multiple beams. The multiple beams are arranged in a line at substantially regular intervals in a direction normal to a scanning direction of the multiple beams on a recording medium. Each beam is modulated and focused on the recording medium while the multiple beams are scanned over the recording medium. By forming multi-beams, high resolution is obtained. However, since only a fraction of the power of the single laser exists in each spot, the power in each spot is low.

U.S. Pat. No. 4,978,974 (M. Etzel), issued on Dec. 18, 1990, discloses an multi-spot imaging recorder wherein a linear array of laser diodes is mounted to project the output of the diodes onto a thermally activated photosensitive material movable along a predetermined path. The array of diodes is linearly aligned in a direction parallel to the path of movement of the photosensitive material. Additionally, the laser diodes are activated simultaneously as a group. Optical means are provided between the array of laser diodes and the photosensitive material to provide an imaging spot on the photosensitive material which is elongated in a direction perpendicular to the path of movement of the photosensitive material. More particularly, different laser diodes are disposed on a chip, and are separated by a relatively large distance to avoid cross talk between the diodes. A waveguide structure is used to provide an effective decreased distance between laser beams of the array of laser diodes.

A major problem with diode lasers is the fact that the divergence angles of the light can be different from one diode laser to another. These divergence variations cause spot-to-spot beam size variations at the print medium. It is desirable to provide a simple multiple diode laser printing system that includes a linear or two-dimensional laser array, avoids the use of optical fibers or waveguide structures, and corrects for divergence differences of the lasers.

SUMMARY OF THE INVENTION

The present invention is directed to a printing technique that shapes and then combines light beams from several diode lasers into a linear array or a two-dimensional array.

Viewed from one aspect, the present invention is directed to a printing system for printing an image on a light sensitive print medium. The printing system comprises plurality of N lasers disposed in a plane forming a plurality of N diverging laser light beams, a stop plane comprising a stop aperture therein for passing the plurality of N laser light beams from the plurality of N lasers, beam shaping and directing means, and an optical system. The beam shaping and directing means is disposed between each of the plurality of N lasers and the stop plane. The beam shaping and directing means comprises a plurality of N channels for shaping the plurality of N laser light beams, respectively, from the respective plurality of N lasers into a plurality of N substantially circular output laser light beams, respectively. The beam shaping and directing means also directs and substantially focuses the plurality of N substantially circular output laser light beams at a central area of the stop aperture of the stop plane. This combines the plurality of N substantially circular output laser light beams which arrive at the stop aperture with first predetermined angular separations. The optical system comprises a front focal plane disposed at the stop plane for transforming the combined plurality of N substantially circular output laser light beams at the first predetermined angular separations of the plurality of N laser light beams at the stop aperture into a plurality of N substantially circular output laser light beams at a rear stop image plane of the optical system with second predetermined angular separations. The second predetermined angular separations are less than the first predetermined angular separations by a magnification factor of the optical system.

Viewed from another aspect, the present invention is directed to a printing system for printing an image on a light sensitive print medium. The printing system comprises at least two sets of a plurality of N lasers each forming an array of lasers for providing a plurality of at least 2N diverging laser light beams, a stop plane comprising a stop aperture therein for passing the plurality of at least 2N laser light beams from the at least two sets of the plurality of N lasers each, at least two beam shaping and directing means, and an optical system. Each beam shaping and directing means is disposed between a separate one of the at least two sets of plurality of N lasers each and the stop plane. Each beam shaping and directing means comprises a plurality of N channels for shaping the plurality of N laser light beams, respectively, from a separate set of the plurality of N lasers into a plurality of N substantially circular output laser light beams, respectively. Additionally, each beam shaping and directing means directs and substantially focuses the plurality of N substantially circular output laser light beams at a central area of the stop aperture of the stop plane. In this manner, the plurality of N substantially circular output laser light beams is combined and then arrive at the stop aperture with first predetermined angular separations. The optical system comprises a front focal plane disposed at the stop plane for transforming each of the combined plurality of N substantially circular output laser light beams from each of the at least two beam shaping and directing means received at the first predetermined angular separations at the stop aperture into a plurality of N substantially circular output laser light beams at a rear stop image plane of the optical system with second predetermined angular separations. The second predetermined angular separations are less than the first predetermined angular separations by a magnification factor of the optical system.

The invention will be better understood from the following more detailed description taken with the accompanying drawings and claims.

The drawings are not necessarily to scale.

DETAILED DESCRIPTION

It is to be understood hereinafter that corresponding elements in the various figures have the same designation numbers and functions.

Figure 1:
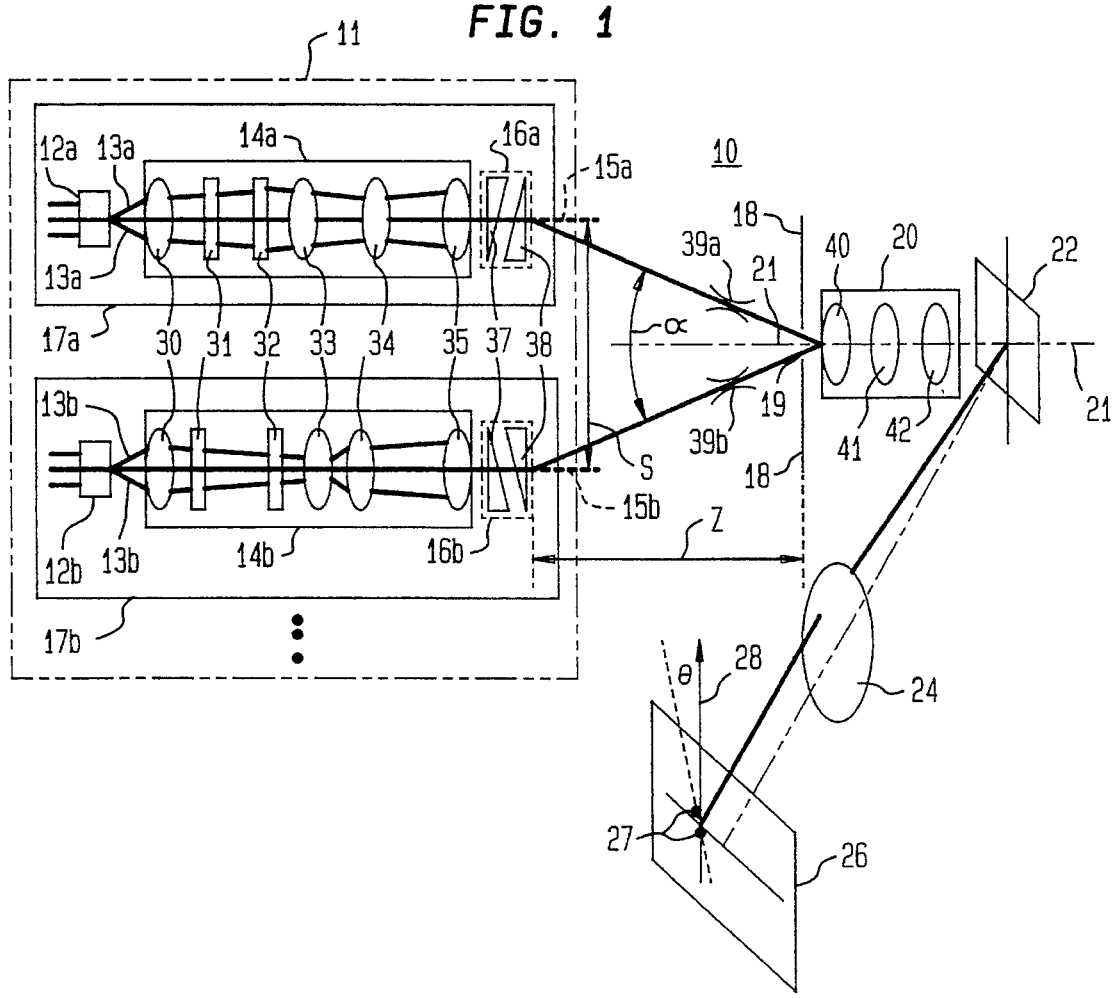
FIG. 1 is a block diagram of a printing system in accordance with a first embodiment of the present invention.

Referring now to FIG. 1, there is shown a block diagram of a printing system 10 in accordance with a first embodiment of the present invention. The printing system 10 comprises a printhead assembly 11 (shown within a dashed line rectangle) comprising N channels of which only channels 17a and 17b are shown within separate rectangles. The channels 17a and 17b comprise first and second laser diodes 12a and 12b, respectively, for emitting respective first and second diverging light beams 13a and 13b, first and second beam shapers 14a and 14b (shown within separate rectangles), respectively, and respective first and second prism means 16a and 16b (shown within separate dashed line rectangles) disposed along separate first and second optical axes 15a and 15b, respectively. The printing system 10 further comprises a stop plane 18 having a stop 19 (aperture) therein, an optical system 20 (shown within a rectangle), a deflector plane 22, a scanning lens 24, and a light sensitive print medium 26. The first and second beam shapers 14a and 14b of the channels 17a and 17b, respectively, of the printhead assembly 11 receive the respective diverging light beams 13a and 13b from the first and second laser diodes 12a and 12b, respectively, and shape and then direct the respective shaped light beams 13a and 13b to the first and second prism means 16a and 16b, respectively.

Each of the beam shapers 14a and 14b comprises a collector lens 30, first, second, third, and fourth cylinder lenses designated 31, 32, 33, and 34, respectively, and a spherical lens 35 disposed in sequence along the optical axes 15a and 15b, respectively, of the respective light beams 13a and 13b. The collector lens 30 receives the associated diverging light beam 13a or 13b and functions to reduce its divergence. The first and second cylinder lenses 31 and 32 receive the light passing through the collector lens 30 and have magnification power in a "Y" scan direction, while the third and fourth cylinder lenses 33 and 34 have magnification power in the "X" scan direction which is orthogonal to the "Y" scan direction. The spherical lens 35 receives the light passing through the fourth cylinder lens and functions to converge the associated light beam 13a or 13b via the associated prism 16a or 16b to the stop 19 of the plane 18. It is to be understood that the order of the cylinder lenses 31, 32, 33, and 34 can be changed in any suitable manner.

Additionally, the four cylinder lenses 31, 32, 33, and 34 in each of the beam shapers 14a and 14b can be translated (moved) along an optical axis 15a and 15b, respectively, of the respective beam shaper 14a and 14b to correct for any divergence difference of the two light beams 13a and 13b, respectively, from the respective laser diodes 12a and 12b. As a result of such cylinder lens translations, a same beam size at the output of the first and second beam shapers 14a and 14b is provided. In other words, the shapers 14a and 14b do not provide collimated light beams at their output ends. Instead, each of the shapers 14a and 14b generates a mildly converging circular laser light beam that is substantially focused at the stop plane 18. Additionally, pointing angles at which the light from the lasers 12a and 12b is directed in reference to its mechanical mount (not shown) are different from one laser to the other. The light beam divergence variations and the laser pointing differences cause spot-to-spot beam size and position variations at the light sensitive print medium 26 from one spot 27 to the other. Therefore, in accordance with the present invention, the anamorphic nature of the associated light beam in the X and Y orthogonal directions received by the shapers 14a and 14b are compensated for by the cylinder lenses 31, 32, 33, and 34 of each of the shaper 14a and 14b so that the light beams emerging from the shapers 14a and 14b are circular.

The shaped light beams 13a and 13b from the first and second beam shapers 14a and 14b, respectively, are angularly directed and combined into one spot at the stop plane 18 by the respective first and second prism means 16a and 16b. Each of the first and second prism means 16a and 16b comprises a first and a second prism designated 37 and 38, respectively, whose rotation about the optical axis 15a and 15b, respectively, deflects the light beam to the center of the stop 19 at the stop plane 18. To provide for a smallest beam size from each of the beam shapers 14a and 14b, given a certain distance "Z" from the first and second prism means 16a and 16b to the stop plane 18, waists 39a and 39b (e.g., a waist of 0.5 millimeters) of the shaped light beams 13a and 13b, respectively, from the respective beam shapers 14a and 14b are positioned just in front (e.g., 5 millimeters) of the stop 19. Therefore, the beam size at the stop plane 18 is very small and is arriving at a relatively large angle from an optical axis 21 of the optical system 20.

The optical system 20 comprises a plurality of three lenses 40, 41, and 42 disposed along an optical axis 21 to form a magnifying system. The optical system 20 functions to image the light image of the combined beams 13a and 13b at the stop 19 at the deflector plane 22. As a result, the waists 39a and 39b of the combined light beams 13a and 13b overlap at the deflector plane 22. More particularly, the light beams 13a and 13b are angularly separated at the stop 19 by an angle $\alpha=S/Z$, for small angles $\alpha$, $\alpha=2\tan^{-1}(S/2Z)$ for large angles $\alpha$; where S is the separation distance of the optical axes 15a and 15b of the beam shapers 14a and 14b, respectively, and Z is the distance from an end of the prism means 16a and 16b to the stop plane 18. The size of the combined beams 13a and 13b at the deflector plane 22 is "m" times (magnification of optical system 20) the size of the combined beams at the stop 19, and the angular separation of the combined beams 13a and 13b emerging from the deflector plane 22 is reduced by a factor of "m". It is to be understood that any suitable number of lenses can be used in the optical system 20 which permit small beams with large angular separations at the stop 19 to be converted into large beams with small angular separations at the deflection plane 22. Usually the use of one lens in the optical system 20 is impracticable, the use of two lenses is a very restrictive arrangement requiring the lenses to be spaced very closely, and the use of three lenses is sufficiently flexible and is not as complex and expensive as an optical system using more than three lenses.

The deflector plane 22 (e.g., a galvanometer mirror, polygon or other such element) is positioned at a front focal plane of the scanning lens 24. Thus, when the deflector plane (mirror) is rotated or oscillated, the beams 13a and 13b are telecentric to the light sensitive print medium 26. In other words, an incidence angle at the light sensitive print medium 26 is zero in the scanning direction of the deflector plane 22 This has the advantage that if there is a focusing error, the beam separation between the different spots 27 is preserved. The incidence angle in a cross scan direction is usually not zero degrees in order to prevent the creation of fringes due to interference of light from different layers of the light sensitive print medium 26.

Additionally, by positioning the light sensitive print medium 26 at a back focal plane of the scanning lens 24, the waists 39a and 39b of the beams 13a and 13b, respectively, projected onto the deflector plane 22 will be located at the plane of the print medium 26. This provides for a large depth of focus. A moving galvanometer mirror at the deflector plane 22 then scans the spots 27 produced by the light beams 13a and 13b across the light sensitive print medium 26 in a first direction while the print medium 26 is moved in a cross scan direction. When a plane of the optical axes 15a and 15b of the channels 17a and 17b, respectively, of the printhead assembly 11 is rotated about the optical axis 21 by an angle θ, the array of spots 27 at the plane of the print medium 26 is rotated accordingly by the angle θ (as is shown in FIG. 1) to provide closely spaced spots 27 at the image. In this regard see, for example, copending patent application Ser. No. 749,037 (T. Mackin et al.), filed on Aug. 23, 1991 now U.S. Pat. No. 5,258,776. In the copending Patent application, a high resolution thermal printer is disclosed where a plurality of lasers are aligned at a predetermined acute angle θ to a line 28 perpendicular to the rotation of a drum mounting a light sensitive print medium to provide selective very close spacings between adjacent spots on each line of an image being printed.

Figure 2:
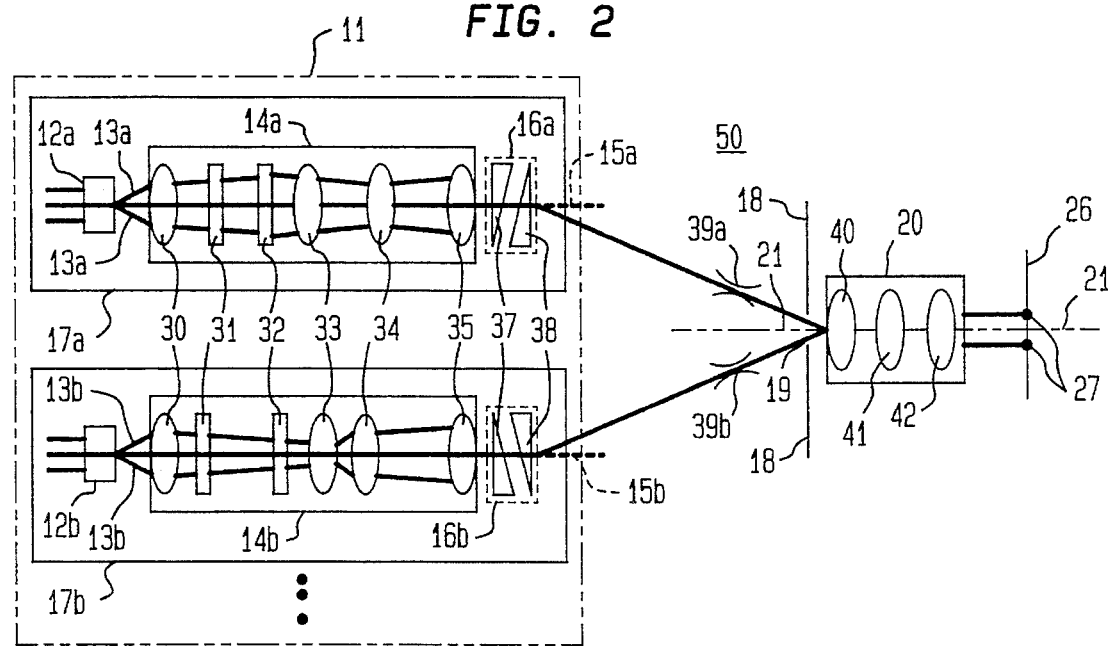
FIG. 2 is a block diagram of a printing system in accordance with a second embodiment of the present invention.

Referring now to FIG. 2, there is shown a block diagram of a printing system 50 in accordance with a second embodiment of the present invention. The printing system 50 is similar to the printing system 10 of FIG. 1 and comprises a corresponding printhead assembly 11 (shown within a dashed line rectangle) to the printhead assembly 11 of FIG. 1 comprising a plurality of N channels, of which only channels 17a and 17b are shown within separate rectangles. The channels 17a and 17b comprise first and second laser diodes 12a and 12b, respectively, for emitting respective first and second diverging light beams 13a and 13b, first and second beam shapers 14a and 14b, respectively, (shown within separate rectangles), and respective first and second prism means 16a and 16b (shown within separate dashed line rectangles) disposed along first and second optical axes 15a and 15b, respectively. The printing system 50 further comprises a stop plane 18 having a stop 19 (aperture) therein, an optical system 20 (shown within a rectangle), and a light sensitive print medium 26 having a same function as the corresponding elements in the printing system 10 of FIG. 1. Each of the beam shapers 14a and 14b of the channels 17a and 17b, respectively, comprises a collector lens 30, first, second, third, and fourth cylinder lenses designated 31, 32, 33, and 34, respectively, and a spherical lens 35 in sequence in the optical path of the light beams 13a and 13b, respectively, which have the same function as the corresponding elements in the beam shapers 14a and 14b of FIG. 1. The optical system 20 comprises a plurality of three lenses 40, 41, and 42 disposed along the optical axis 21 to form a magnifying system which have the same function as described for the corresponding elements of the optical system 20 of FIG. 1. The primary difference between the printing system 10 of FIG. 1 and the printing system 50 of FIG. 2 is that the printing system 50 does not contain a deflector plane 24 and a scanning lens 22 as used in the printing system 10. Instead, the print medium 26 is positioned at an image plane where the deflector plane 22 is positioned in the printing system 10 of FIG. 1. More particularly, the angularly separated and combined beams 13a and 13b at the stop plane 18 are directly converted by the optical system 20 into a set of spots 27 on the print medium 26.

Figure 3:
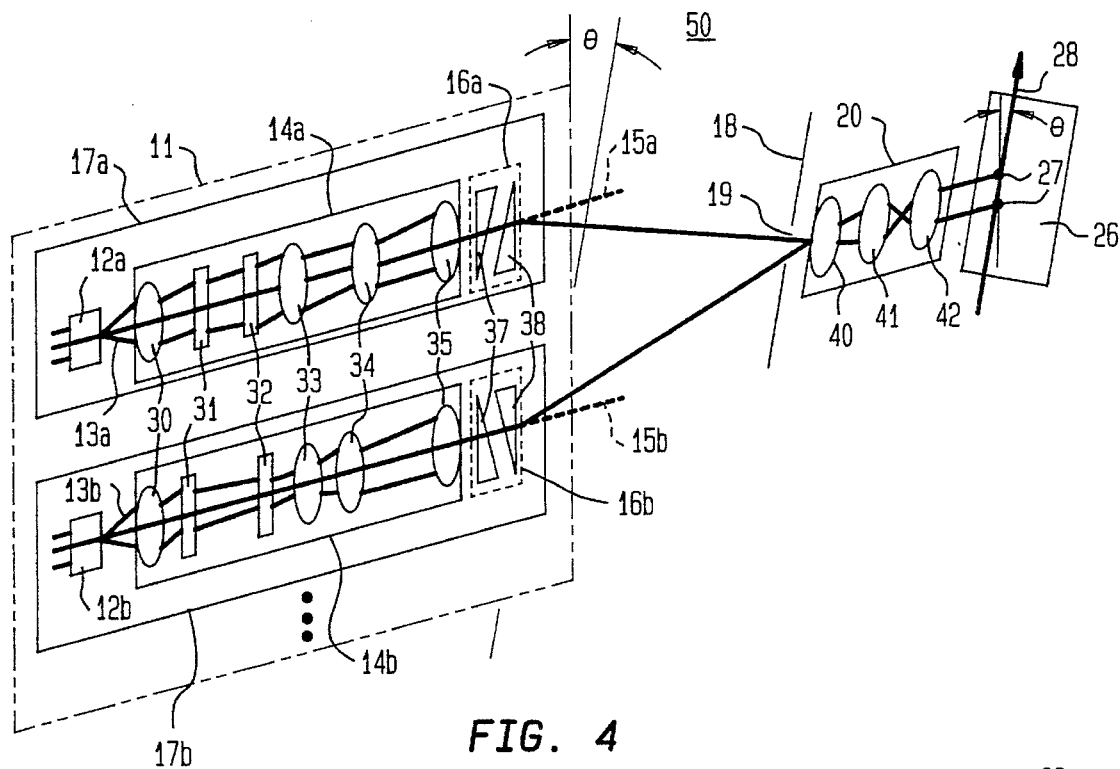
FIG. 3 shows a view in perspective of the printing system of FIG. 2 wherein a printhead assembly is rotated about an optical system axis to rotate a light spot array on a print medium by an angle θ to a scan direction.
Figure 4:
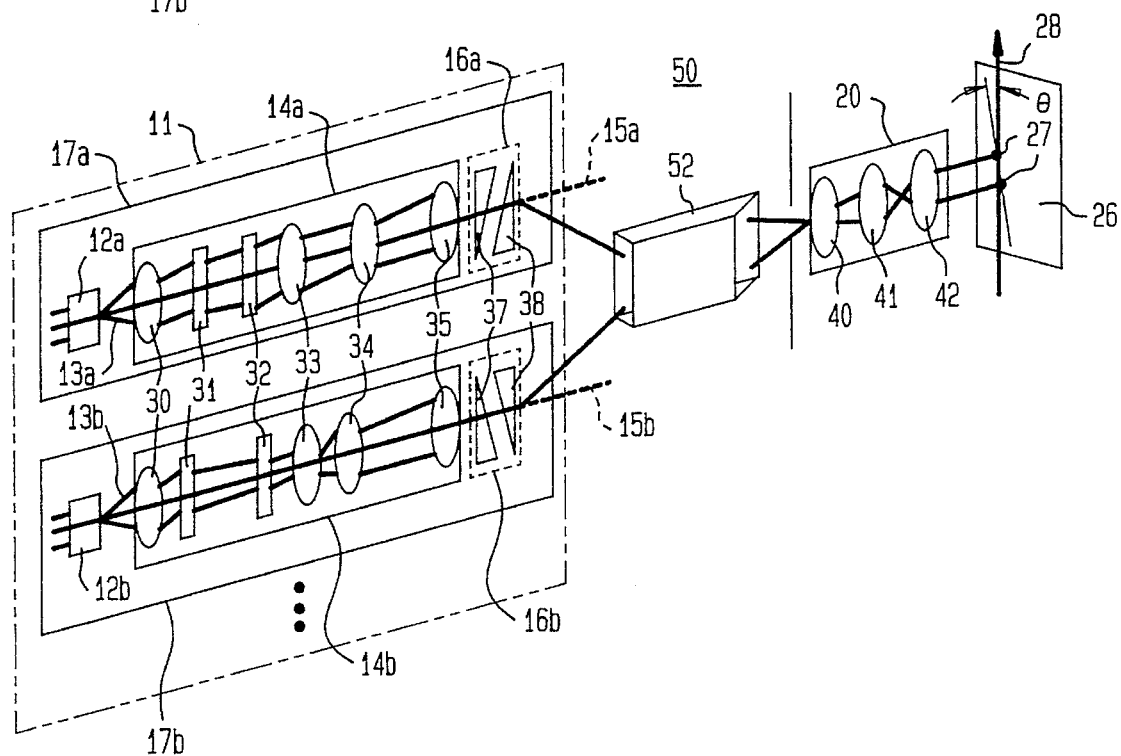
FIG. 4 shows a view in perspective of an alternative arrangement of the printing system of FIG. 2 wherein a dove prism is used between a printhead assembly and a stop plane to rotate a light spot array on a print medium by an angle θ to scan direction.

Referring now to FIGS. 3 and 4, there are shown a view in perspective of a modified printing system 50 of FIG. 2 wherein a light spot array at the print medium 26 is rotated an angle θ to the scan direction. In FIG. 3, the plane of the optical axes 15a and 15b of the printhead assembly 11 is rotated by the angle θ about the optical axis 21 this axis (not shown in FIG. 3, but shown in FIG. 1) of the optical system 20. This provides closely packed spots 27 at an angle θ on print medium 26 to a line 28 perpendicular to the rotation of a drum mounting a light sensitive print medium 26 as described hereinbefore for the printing system 10 of FIG. 1. In FIG. 4, a dove prism 52 (or a reversion prism, etc.) is used between the printhead assembly 11 and the stop plane 18 to rotate a light spot 27 array by an angle θ to a line 28 at the light sensitive print medium 26 which is perpendicular to the rotation of a drum mounting the print medium 26. In the arrangement of either one of FIGS. 3 or 4, the image on the print medium 26 is then scanned in two orthogonal directions over the print medium 26 using any suitable means to create a desired printed image.

Figure 5:
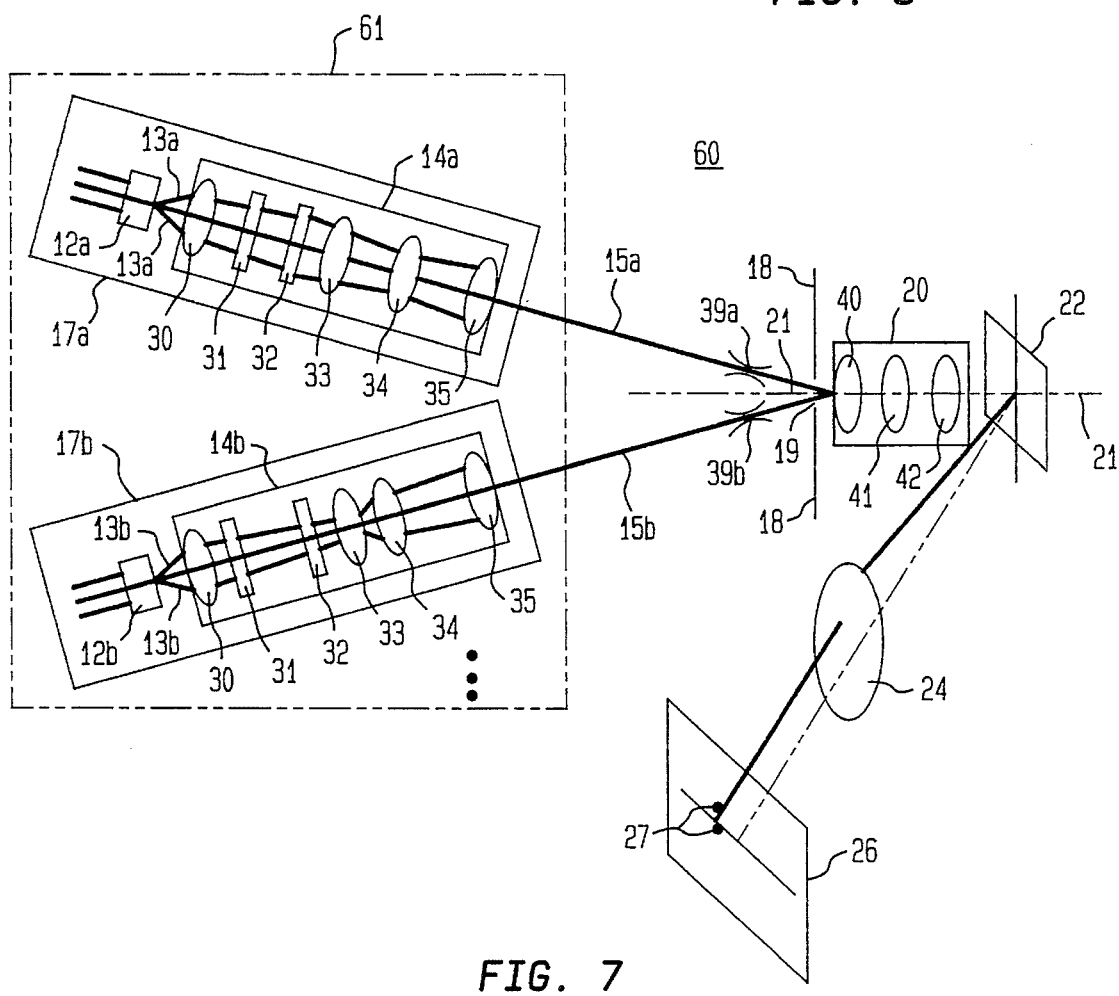
FIG. 5 is a block diagram of a printing system in accordance with a third embodiment of the present invention.

Referring now to FIG. 5, there is shown a block diagram of a printing system 60 in accordance with a third embodiment of the present invention. The printing system 60 is similar to the printing system 10 of FIG. 1, and comprises a printhead assembly 61 (shown within a dashed line rectangle) which is similar to the printhead assembly 11 of FIG. 1. More particularly, the printhead assembly 61 comprises a plurality of N channels of which only channels 17a and 17b are shown within separate rectangles. The first and second channels comprise first and second laser diodes 12a and 12b, respectively, for emitting respective first and second diverging light beams 13a and 13b, and first and second beam shapers 14a and 14b, respectively, (shown within separate rectangles) disposed along respective optical axes 15a and 15b. Each of the beam shapers 14a and 14b comprises a collector lens 30, first, second, third, and fourth cylinder lenses designated 31, 32, 33, and 34, respectively, and a spherical lens 35 in sequence along the optical axes 15a and 15b, respectively, of the respective light beams 13a and 13b which have the same function as the corresponding elements in the beams shapers 14a and 14b in FIG. 1. The printing system 60 further comprises a stop plane 18 having a stop 19 (aperture) therein, an optical system 20 (shown within a rectangle), a deflector plane 22, a scanning lens 24, and a light sensitive print medium 26 having a same function as the corresponding elements in the printing system 10 of FIG. 1. The primary difference between the printing system 60 of FIG. 5 and the printing system 10 of FIG. 1 is that the printhead assembly 61 of FIG. 5 omits the first and second prism means 16a and 16b found in the printhead assembly 11 of FIG. 1. Instead, the first laser 12a and its associated first beam shaper 14a, and the second lasers 12b and its associated second beam shaper 14b, have their optical axes 15a and 15b, respectively, directed towards the center of the stop 19 in the stop plane 18. In all other respects, the printing system 60 operates in the same manner as the printing system 10 of FIG. 1.

Figure 6:
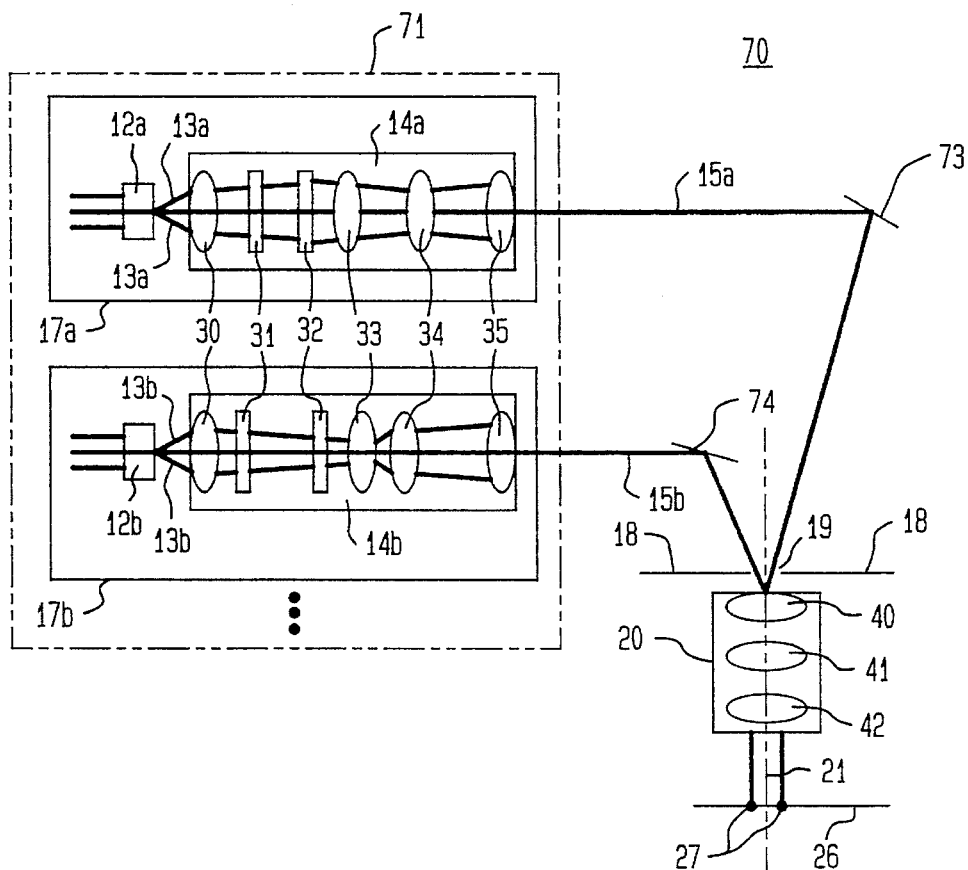
FIG. 6 is a block diagram of a printing system in accordance with a fourth embodiment of the present invention.

Referring now to FIG. 6, there is shown a block diagram of a printing system 70 in accordance with a fourth embodiment of the present invention. The printing system 70 is similar to the printing system 50 of FIG. 2 and comprises a printhead assembly 71 (shown within a dashed line rectangle) which is similar to the printhead assembly 11 of FIG. 2. More particularly, the printhead assembly 71 comprises a plurality of N channels of which only channels 17a and 17b are shown within separate rectangles. The first and second channels 17a and 17b comprise first and second laser diodes 12a and 12b, respectively, for emitting respective first and second diverging light beams 13a and 13b, and first and second beam shapers 14a and 14b, respectively, (shown within separate rectangles) disposed along respective optical axes 15a and 15b of the channels 17a and 17b, respectively. Each of the beam shapers 14a and 14b comprises a collector lens 30, first, second, third, and fourth cylinder lenses designated 31, 32, 33, and 34, respectively, and a spherical lens 35 in sequence along the optical axes 15a and 15b of the light beams 13a and 13b, respectively, which have the same function as the corresponding elements in the printhead assembly 11 of FIG. 2. The printing system 70 further comprises a stop plane 18 having a stop 19 (aperture) therein, an optical system 20 (shown within a rectangle), and a light sensitive print medium 26 having a same function as the corresponding elements in the printing system 50 of FIG. 2. Disposed between the printhead assembly 71 and the stop plane 18 are first and second mirrors 73 and 74 which are disposed to deflect the first and second light beams 13a and 13b, respectively, to the center of the stop 19 in the stop plane 18. The primary difference between the printing system 70 of FIG. 6 and the printing system 50 of FIG. 2 is that the printhead assembly 71 of FIG. 6 omits the first and second prism means 16a and 16b found in the printhead assembly 11 of FIG. 2, and uses the mirrors 73 and 74 to perform the function of the prism means 16a and 16b of FIG. 2. In all other respects, the printing system 70 operates in the same manner as the printing system 50 of FIG. 2.

Figure 7:
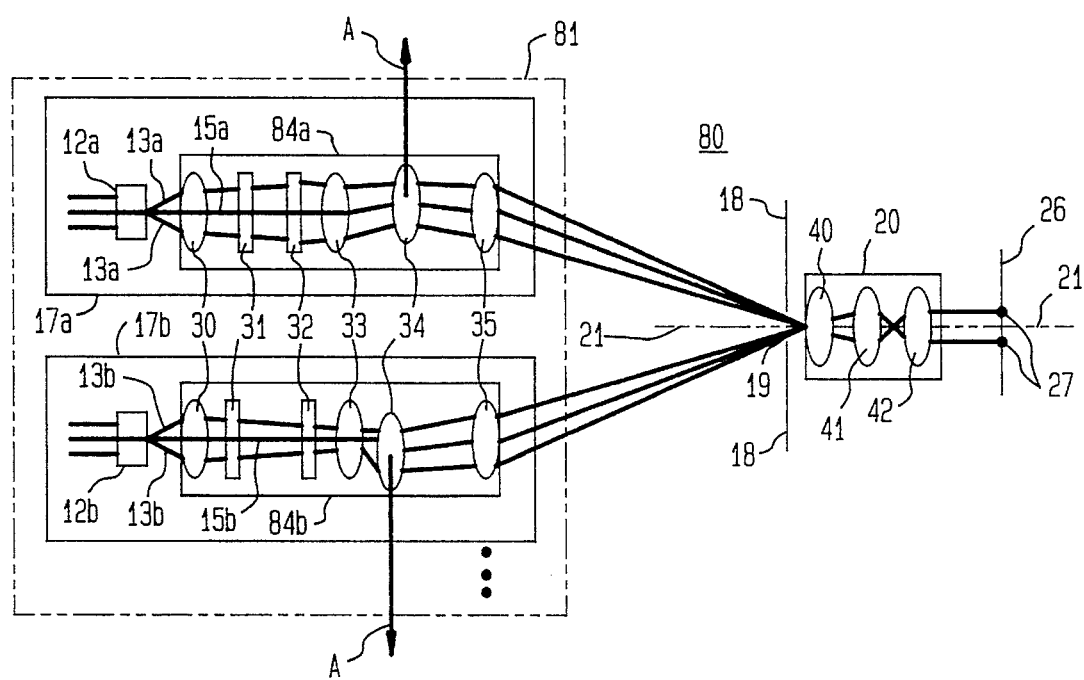
FIG. 7 is a block diagram of a printing system in accordance with a fifth embodiment of the present invention.

Referring now to FIG. 7, there is shown a block diagram of a printing system 80 in accordance with a fifth embodiment of the present invention. The printing system 80 is similar to the printing system 50 of FIG. 2 and comprises a printhead assembly 81 (shown within a dashed line rectangle) which is similar to the printhead assembly 11 of FIG. 2. More particularly, the printhead assembly 81 comprises a plurality of N channels of which only channels 17a and 17b are shown within separate rectangles. The channels 17a and 17b comprise first and second laser diodes 12a and 12b, respectively, for emitting respective first and second diverging light beams 13a and 13b, and first and second beam shapers 84a and 84b, respectively, (shown within separate rectangles) disposed along respective optical axes 15a and 15b (the axes are not specifically shown in FIG. 7 but are shown in, e.g., FIGS. 1–4); of the channels 17a and 17b, respectively. Each of the beam shapers 84a and 84b is similar to the first and second beam shapers 14a and 14b, respectively, of FIG. 2 and comprises a collector lens 30, first, second, third, and fourth cylinder lenses designated 31, 32, 33, and 34, respectively, and a spherical lens 35 in sequence along the optical axes 15a and 15b of the light beams 13a and 13b, respectively. The lenses 30, 31, 32, 33, 34, and 35 have the same function as the corresponding lenses in the printhead assembly 11 of FIG. 2. The printing system 80 further comprises a stop plane 18 having a stop 19 (aperture) therein, an optical system 20 (shown within a rectangle), and a light sensitive print medium 26 having a same function as the corresponding elements in the printing system 50 of FIG. 2. The primary difference between the printing system 80 of FIG. 7 and the printing system 50 of FIG. 2 is that the printhead assembly 81 of FIG. 7 omits the first and second prism means 16a and 16b found in the printhead assembly 11 of FIG. 2, and relocates the fourth cylinder lens 34 in the beams shapers 84a and 84b in the direction shown by the arrow A to perform the function of the prism means 16a and 16b of FIG. 2. More particularly, the fourth cylinder lens 34 in the beams shapers 84a and 84b are moved to direct the beam 13a and 13b leaving the beam shapers 84a and 84b to the center of the stop 19 at the stop plane 18. In all other respects, the printing system 80 operates in the same manner as the printing system 50 of FIG. 2.

Figure 8:
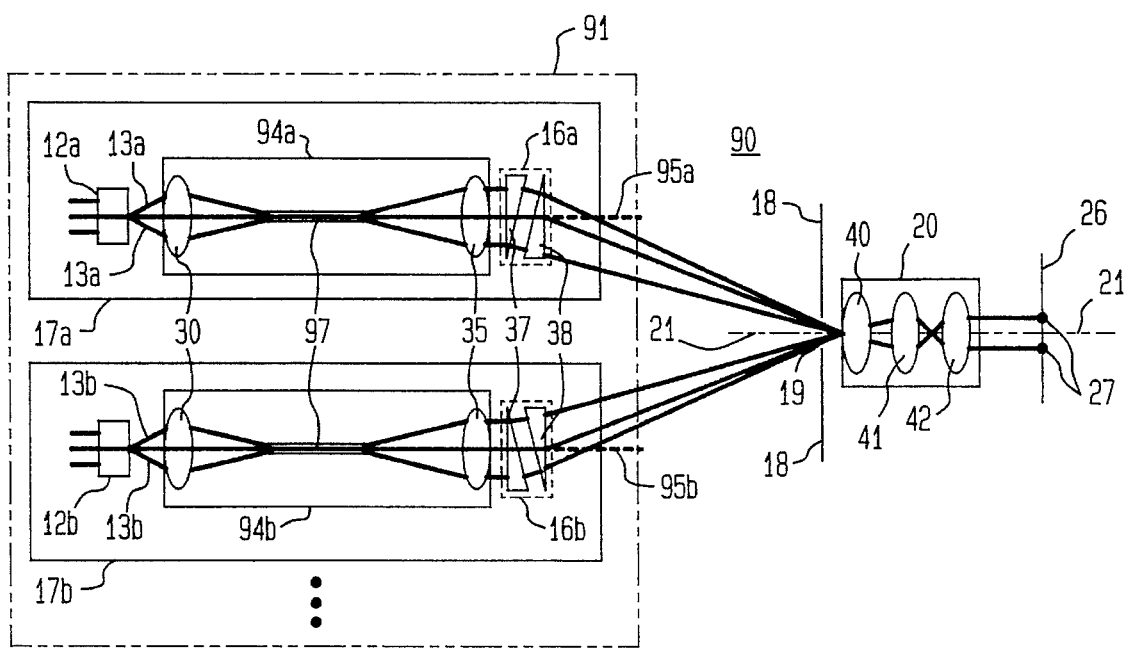
FIG. 8 is a block diagram of a printing system in accordance with a sixth embodiment of the present invention.

Referring now to FIG. 8, there is shown a block diagram of a printing system 90 in accordance with a sixth embodiment of the present invention. The printing system 80 is similar to the printing system 50 of FIG. 2 and comprises a printhead assembly 91 (shown within a dashed line rectangle) which is similar to the printhead assembly 11 of FIG. 2. More particularly, the printhead assembly 91 comprises a plurality of N channels of which only channels 17a and 17b are shown within separate rectangles. The first and second channels 17a and 17b comprise first and second laser diodes 12a and 12b, respectively, for emitting respective first and second diverging light beams 13a and 13b, first and second beam shapers 94a and 94b, respectively, (shown within separate rectangles), and respective prism means 16a and 16b disposed along the optical axes 95a and 95b, respectively, of the respective channels 17a and 17b. Each of the beam shapers 94a and 94b comprises a collector lens 30, an optical fiber 97, and a spherical lens 35 disposed in sequence along the optical axes 95a and 95b of the light beams 13a and 13b, respectively.

The printing system 80 further comprises a stop plane 18 having a stop 19 (aperture) therein, an optical system 20 (shown within a rectangle), and a light sensitive print medium 26 having a same function as the corresponding elements in the printing system 50 of FIG. 2. The shaped light beams 13a and 13b from the first and second beam shapers 94a and 94b, respectively, are angularly directed and combined into one spot at the stop plane 18 by the respective first and second prism means 16a and 16b. The prism means 16a and 16b comprise first and second prisms 37 and 38 which function in the same manner as the corresponding prism means 16a and 16b in the printhead assembly 11 of FIG. 2. The primary difference between the printing system 80 of FIG. 8 and the printing system 50 of FIG. 2 is in each of the first and second beam shapers 94a and 94b of the printhead assembly 91 of FIG. 8. More particularly, the diverging light beams 13a and 13b from the diode lasers 12a and 12b, respectively, are collected and focused by the collector lens 30 of the beams shapers 14a and 14b, respectively, into a first end of the optical fiber 97. The fiber optics 97 are used to provide for a light source whose size in invariant with the divergence of each of the diode lasers 12a and 12b. As a result, the fiber optics 97 in each of the beam shapers 94a and 94b provides a same sized circular diverging beam at a second end of the fiber optics 97 for propagation to the spherical lens 35. The spherical lens 35 receives the spherical light beam emerging from the second end of the fiber optic 97 and functions to converge the associated light beam 13a or 13b via the associated prism 16a or 16b to the stop 19 of the plane 18. Therefore, the fiber optics 97 provides a function similar to the lenses 31, 32, 33, and 34 in the beam shapers 14a and 14b of the printing system 50 of FIG. 2 to provide a same sized circular output light beam 13a and 13b. In other words, the anamorphic nature of the light beams 13a and 13b in the X and Y orthogonal directions received by the beam shapers 94a and 94b are compensated for by the fiber optics 97 of each of the shaper 14a and 14b so that the light beams 13a and 13b emerging from the beam shapers 94a and 94b are circular. In all other respects, the printing system 90 of FIG. 8 operates in the same manner as the printing system 50 of FIG. 2.

Figure 9:
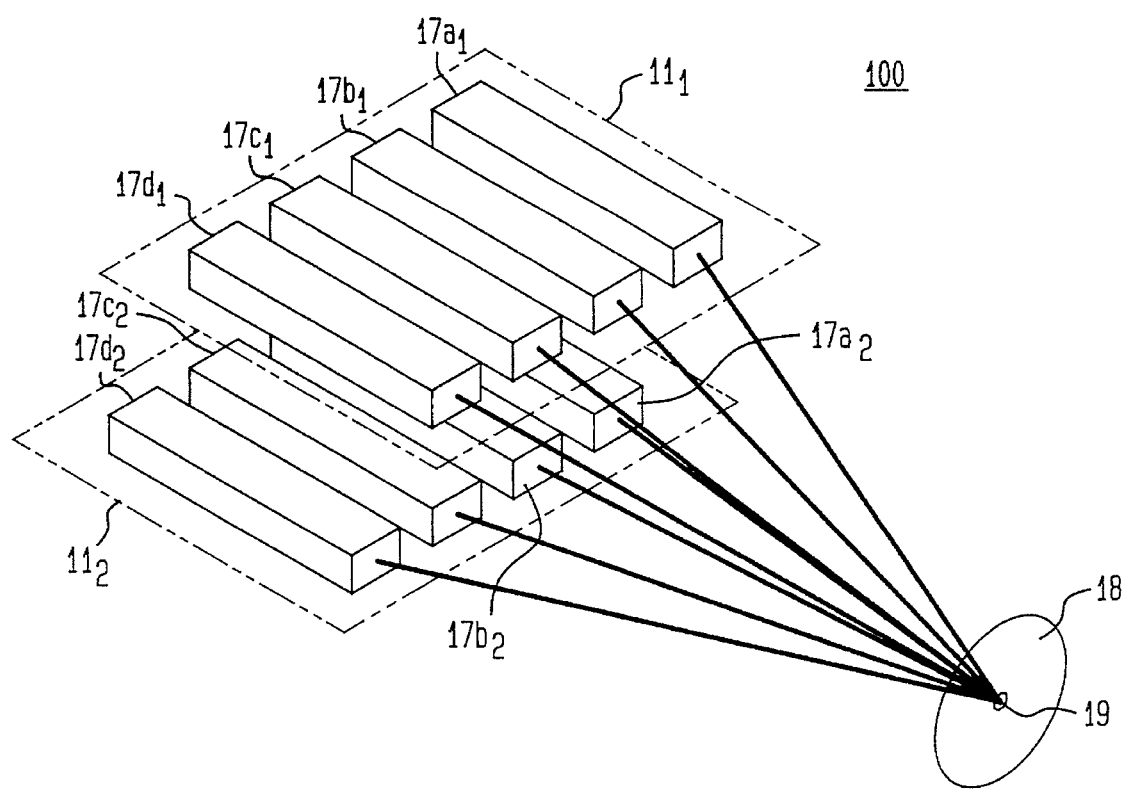
FIG. 9 shows a view in perspective of a two dimensional laser spot array formed by stacking one dimensional arrays of FIG. 1 or 2 in accordance with the present invention.

Referring now to FIG. 9, there is shown a view in perspective of a two-dimensional laser spot array 100. The laser spot array 100 is formed by mounting a first one-dimensional printhead assembly $11_1$ (shown within a dashed line rectangle), and a second one-dimensional printhead assembly $11_2$ (shown within a dashed line rectangle), each of the printhead assemblies $11_1$ and $11_2$ corresponding to the printhead assembly 11 of FIG. 1. The printhead assembly $11_1$ comprises a plurality of N channels of which only channels $17a_1$, $17b_1$, $17c_1$, and $17d_1$ are shown. The printhead assembly $11_2$ comprises a plurality of N channels of which only channels $17a_2$, $17b_{2\,2}$, $17c_2$, and $17d_2$ are shown. It is to be understood that each of the channels $17a_1$ 1, $17b_1$ 1, $17c_1$, $17d_1$, $17a_2$, $17b_2$, $17c_2$, and $17d_2$ comprise a diode laser 12 (not shown), a beam shaper 14 (not shown), and a prism means 16 (also not shown) as shown in the each of the channels 17a and 17b of the printhead assembly 11 of FIG. 1. The first printhead assembly $11_1$ is aligned with the second printhead assembly 11b in accordance with the present invention. It is to be understood that additional correspondingly arranged printhead assemblies can be aligned with the first and second printhead assemblies $11_1$ and $11_2$ shown in FIG. 9.

Each of the printhead assemblies $11_1$ and $11_2$ operates as described for the printhead assembly 11 of FIG. 1. More particularly, the circular output laser light beams from each of the first and second printhead assemblies 11a and 11b are directed to the stop 19 in the stop plane 18 by the use of a prism means (e.g., prism means 16a or 16b) as described hereinbefore for the printing systems 10 and 50 of respective FIGS. 1 and 2. Alternatively, circular output laser light beams from each of the first and second printhead assemblies $11_1$ and $11_2$ are directed to the central area of the stop 19 using any of the techniques shown in FIGS. 5, 6, or 7.

It is to be understood that additional printhead assemblies (not shown) comprising N channels 17 can be mounted above and/or below the two printhead assemblies shown in FIG. 9 in accordance with the present invention. Such additional printhead assemblies also have their circular output laser light beams directed at the central area of the stop 19 in the stop plane 18 as shown in the printing system 10 of FIG. 1.

It is to be appreciated and understood that the specific embodiments of the invention described hereinabove are merely illustrative of the general principles of the invention. Various modifications may be made by those skilled in the art which are consistent with the principles set forth. For example, any suitable form or configuration for beams shapers 14a and 14b can be used that provides a circular output laser light beam 13a or 13b that is focused to the stop 19 in the stop plane 18. Still further, the diode lasers 12a and 12b can comprise either single mode or multi-mode laser diodes.

What is claimed is:

1. A printing system for printing an image on a light sensitive medium, the printing system comprising:

N lasers, N being a positive integer greater than one, for forming N diverging laser light beams along a plurality of optical axes, all of said lasers being disposed in a common plane, wherein each of said lasers emanates a corresponding one of said diverging laser beams along a corresponding one of said optical axes;

a stop plane having a stop aperture therein;

N individual optical beam shaper and director assemblies, collectively situated between all of said lasers and the stop plane, wherein each one of said assemblies variably converts a corresponding one of the diverging laser beams emanating from a different corresponding one of said lasers into a corresponding intermediate beam, having a substantially circular and converging cross-section, that is directed at a central portion of the stop aperture and substantially focused thereat so as to form N intermediate beams which substantially pass through said aperture, each one of said assemblies being oriented along a corresponding one of the optical axes corresponding to one Of said lasers, wherein adjacent ones of said intermediate beams are spaced apart at a first pre-determined angular separation, u, and wherein each of the optical beam shaper and director assemblies comprises:

a radially symmetric collector lens having a sufficiently large numerical aperture to receive one of said diverging laser beams from said corresponding one of said lasers;

a first lens group and a second lens group movably disposed along said corresponding one of the optical axes for converting the one of said diverging laser beams into a beam having a substantially circular cross-section, wherein the first lens group has optical power along a scan direction and the second lens group has optical power along a cross-scan direction; and a spherical lens for converting the substantially circular cross-section beam collectively produced by said first lens group and said second lens group into the corresponding intermediate beam which has a converging substantially circular cross-section; and an optical magnifying and directing assembly having a rear stop image plane and a magnification ratio, m, and situated between said stop plane and said medium for magnifying the intermediate beams passing through the aperture so as to form N corresponding magnified beams and for directing the corresponding magnified beams to said medium as N corresponding output beams such that adjacent ones of said output beams are incident upon the rear stop image plane at a second angular separation substantially equal to $\alpha/m$.

2. The printing system of claim 1 wherein the N lasers and the N beam shaper and director assemblies are disposed in said common plane, said common plane being rotated by a predetermined angle about a longitudinal axis of the optical magnifying and directing assembly and with respect to a scanning direction in order to generate N spots on the medium aligned at a predetermined angle to the scanning direction.

3. The printing system of claim 1 wherein the beam director comprises a prism.

4. The printing system of claim 1 wherein the beam director comprises a mirror.

5. The printing system of claim 1 wherein adjacent ones of the N beam shaper and director assemblies are angularly displaced with respect to each other and relative to a longitudinal axis of the optical magnifying and directing assembly in order to direct the N intermediate beams at the central area of the stop aperture.

6. The printing system of claim 1 further comprising:

a beam deflector, disposed at a rear stop image plane of the optical magnifying and directing assembly, for deflecting the N output beams from the optical magnifying and directing assembly towards the medium, wherein adjacent ones of said output beams are incident upon said beam deflector at the second angular separation substantially equal to $\alpha/m$; and a scanning lens, having a front focal plane situated such that said front focal plane positionally coincides with the beam deflector, for converting an incidence angle of each of the N intermediate beams into a substantially zero incidence angle in a scan direction at the medium.

7. The printing system of claim 6 wherein the beam deflector is movable so as to scan the N output beams over the medium in a predetermined pattern and is selected from a group consisting of a galvanometer mirror, a polygon reflector and a hologon reflector.

8. The printing system of claim 1 further comprising a rotator, disposed between stop plane and the N beam shaping and directing assemblies, for rotating the N output beams about a longitudinal axis of the optical magnifying and directing assembly by a predetermined angle to a scanning direction so as to provide N spots on the medium aligned at the predetermined angle to the scanning direction.

9. The printing system of claim 1 wherein the first lens group and the second lens group comprises first and second, and third and fourth cylindrical lenses, respectively, successively disposed along said corresponding one of the optical axes.

10. The printing system of claim 9 wherein at least one of the first, second, third or fourth cylindrical lenses is moveable along the corresponding one optical axis such that every one of the N output beams at the medium produces substantially the same spot size thereon even though the N lasers have varying divergence angles.

11. A printing system for printing an image on a light sensitive medium, the printing system comprising:

M sets of N lasers each, N and M each being a positive integer greater than one, for forming MN diverging laser light beams along a plurality of optical axes, all of said lasers in each of said sets being disposed in a common plane, wherein each of said lasers emanates a corresponding one of said diverging laser beams along a corresponding one of said optical axes;

a stop plane having a stop aperture therein;

M sets of N individual optical beam shaper and director assemblies, collectively situated between all of said lasers and the stop plane, wherein each one of said assemblies variably converts a corresponding one of the diverging laser light beams emanating from a different corresponding one of said lasers into a corresponding intermediate beam, having a substantially circular and converging cross-section, that is directed at a central portion of the stop aperture and substantially focused thereat so as to form MN intermediate beams which substantially pass through said aperture, each one of said assemblies being oriented along a corresponding one of the optical axes corresponding to one of said lasers, wherein adjacent ones of said intermediate beams associated with each set of lasers are spaced apart at a first pre-determined angular separation, $\alpha$, and wherein each of the optical beam shaper and director assemblies comprises:

a radially symmetric collector lens having a sufficiently large numerical aperture to receive one of said diverging laser beams from said corresponding one of said lasers;

a first lens group and a second lens group movably disposed along said corresponding one of the optical axes for converting the one of said diverging laser beams into a beam having a substantially circular cross-section, wherein the first lens group has optical power along a scan direction and the second lens group has optical power along a cross-scan direction; and a spherical lens for converting the substantially circular cross-section beam collectively produced by said first lens group and said second lens group into the corresponding intermediate beam which has a converging substantially circular cross-section; and an optical magnifying and directing assembly having a rear stop image plane and a magnification ratio, m, and situated between said stop plane and said medium for magnifying the intermediate beams passing through the aperture so as to form MN corresponding magnified beams and for directing the corresponding magnified beams to said medium as MN corresponding output beams such that adjacent ones of said output beams associated with each set of lasers are incident upon the rear stop image plane at a second angular separation substantially equal to $\alpha/m$.

12. The printing system of claim 11 wherein each one of the sets of N lasers and a corresponding different one of the sets of N beam shaper and director assemblies are disposed in said common plane, said common plane being rotated by a predetermined angle about a longitudinal axis of the optical magnifying and directing assembly and with respect to a scanning direction in order to generate N spots on the medium aligned at a predetermined angle to the scanning direction.

13. The printing system of claim 11 wherein the beam director comprises a prism.

14. The printing system of claim 11 wherein the beam director comprises a mirror.

15. The printing system of claim 11 wherein adjacent ones of the N beam shaper and director assemblies in each set thereof are angularly displaced with respect to each other and relative to a longitudinal axis of the optical magnifying and directing assembly in order to direct the MN intermediate beams at the central area of the stop aperture.

16. The printing system of claim 11 further comprising:

a beam deflector, disposed at the rear stop image plane of the optical magnifying and directing assembly, for deflecting the MN output beams from the optical magnifying and directing assembly towards the medium, wherein adjacent ones of said output beams are incident upon said beam deflector at the second angular separation substantially equal to $\alpha/m$; and a scanning lens having a front focal lens, situated such that said front focal plane positionally coincides with the beam deflector, for converting an incidence angle of each of the MN intermediate beams into a substantially zero incidence angle in a scan direction at the medium.

17. The printing system of claim 16 wherein the beam deflector is movable so as to scan the MN output beams over the medium in a predetermined pattern and is selected from a group consisting of a galvanometer mirror, a polygon reflector and a hologon reflector.

18. The printing system of claim 11 further comprising a rotator, disposed between stop plane and the MN beam shaping and directing assemblies, for rotating the MN output beams about a longitudinal axis of the optical magnifying and directing assembly by a predetermined angle to a scanning direction so as to provide MN spots on the medium aligned at the predetermined angle to the scanning direction.

19. The printing system of claim 1 wherein the first lens group and the second lens group comprises first and second, and third and fourth cylindrical lenses, respectively, successively disposed along said corresponding one of the optical axes.

20. The printing system of claim 19 wherein at least one of the first, second, third or fourth cylindrical lenses is moveable along the corresponding one optical axis such that every one of the MN output beams at the medium produces substantially the same spot size thereon even though the MN lasers have varying divergence angles.

* * * * *